United States Patent Office 3,574,640
Patented Apr. 13, 1971

3,574,640
TREATMENT OF MUSTARD SEED
Paul A. Dougherty, Jr., Deerfield, Ill., assignor to
Plochman, Inc., Chicago, Ill.
No Drawing. Filed Feb. 21, 1966, Ser. No. 528,811
Int. Cl. A23l *1/22*
U.S. Cl. 99—140                        6 Claims

ABSTRACT OF THE DISCLOSURE

Mustard seed is contacted with saturated steam for a time sufficient to inactivate the enzyme, myrosinase, to produce a mustard product having a controlled degree of bite and a non-toasted flavor.

---

The present application relates to the treatment of mustard seed and more particularly it relates to a method for producing an improved mustard product.

The food industry has long used mustard as a flavor material. The mustard seed was ground, the seed husks subsequently were separated from the flour, and the dry flour was then used as a condiment. Such dry mustard flour has a characteristic pungent flavor, or "bite" when eaten, which first appears when the dry flour is contacted with water, or hydrated. This "bite" is developed by the action of the enzyme myrosinase, which, in the presence of water, acts upon sinalbin, sinigrin and/or other mustard flavor precursors contained in the mustard seed, forming sinalbin mustard oil (para-hydroxybenzyl isothiocyanate), allyl isothiocyanate or other similar sulphur compounds which provide the characteristic "bite." However, mustard has a flavor apart from such "bite" which frequently is masked or suppressed by the "bite." A mustard product in which such other flavor predominates may be preferred for certain food products, or various degrees of "bite" may be desirable for different food products. It would also be desirable for the mustard product to provide an improved flavor for various food products, to act as a fat emulsifying or water absorptive agent for certain products, and to serve as a carrier for other spices.

Various methods have been used, heretofore, to produce a mustard product in which the characteristic "bite" of mustard flour upon hydration is minimized or totally lacking. Thus it is known to remove the mustard flavor precursors or their conversion products by distillation or solvent extraction and the like. It is also known to provide a mustard product lacking the characteristic "bite" by inactivating the enzyme myrosinase through dry heat treatment at temperatures between 110° C. and 180° C. These methods have various disadvantages in that the equipment required is intricate and costly and requires great operator skill, or is difficult to control, or produces a mustard product lacking certain desirable physical properties or with an undesirable taste. Prior art processes do not provide a method for partial inactivation of myrosinase to produce a mustard product with a controlled level of isothiocyanate compounds to produce a degree of "bite" that may be desirable for certain food products in which the mustard product is incorporated.

Accordingly, it is a principal object of the present invention to provide an improved mustard product and a process for the production of such a product. It is another object of the invention to provide a mustard product having a controlled degree of the "bite" of mustard when the mustard product is hydrated. A further object of the invention is to provide a mustard product having flavor characteristics. These and other objects of the invention will be more clearly understood from the following detailed description of a process and product embodying various of the features of the invention.

It has been found that heating mustard seed by contacting the seed with saturated steam inactivates the enzyme myrosinase and provides a mustard seed that is somewhat hydrated but which has the characteristic "bite" of mustard to a greater or lesser extent as may be desired. The resultant product has a pleasant, nutty, untoasted slightly aromatic flavor.

After the myrosinase enzyme has been inactivated, the hydrated mustard seed is ground to produce finely divided particles and then dried to a moisture content of less than about 10 percent. An improved mustard product is provided which can be stored for long periods of time and which has excellent flavor characteristics and a controlled degree of "bite."

The improved mustard product can be produced using any commercially available mustard seed; however, Alba type mustard seed that is obtained from North America is preferred.

As before pointed out, in the production of commercial mustard flour, the seed hull or "spermoderm" of the seed is usually first removed, and only the inner seed or "endosperm" is ground. For purposes of this application, the term "mustard seed" refers to a mustard product containing both spermoderm and endosperm. To provide the improved mustard product, it has been found preferable to treat natural mustard seed, either whole or cracked, which, of coarse, has the proportions of endosperm and spermoderm normally occurring in mustard seed. It is also possible, however, to treat mixtures of endosperm and spermoderm, supplied from separate sources, which may be combined at levels normally found in mustard seed or at other levels as may be desired in the final treated product.

The mustard seed is treated either in the whole state or is first cracked or crushed in a suitable mill. As will be explained more fully hereinafter, the properties of the final improved mustard product are dependent on the extent to which the mustard seed has been cracked or crushed.

The myrosinase enzyme is then inactivated by contacting the mustard seed with saturated steam in a chamber for a time sufficient for such inactivation. In this connection, the terms "wet" and "saturated" as used hereinafter in this application are used in their normal thermodynamic sense in relation to steam. That is, saturated steam is steam that exists at the vaporization temperature corresponding to the pressure at which the steam is vaporized. Saturated steam may be wet. Wet steam, in this sense, refers to saturated steam which has moisture (liquid water) present in the steam. The level of moisture is related to quality of the steam, which is expressed by the following:

$$x = \frac{m_{(ms)} - m_{(m)}}{m_{(ms)}} \times 100$$

where $x$=quality of steam:
$m_{(ms)}$=weight of moist steam (lbs.)
$m_{(m)}$=weight of moisture in $m_{(ms)}$ lbs. of moist steam (lbs.)

The inactivation of myrosinase may be accomplished to produce a mustard product with a controlled degree of "bite." In this connection, a substanial period of time, in excess of thirty minutes is required to fully convert the sinalbin or sinigrin mustard flavor precursors to isothiocyanate compounds after the mustard seed is contacted with water. The time required for total conversion is, however, dependent upon several physical factors in relation to the mustard seed. If the outer seed hull is left intact the hull acts as a barrier to prevent hydration of the seed interior and to inhibit conversion. The rate of conversion is directly proportional to the surface area provided for action by the enzyme or, stated another way, to the degree to which the seed is cracked or crushed. The rate of conversion may also be increased by increasing the temperature up to a temperature level at which inactivation begins to occur. Inactivation, however, is not instantaneous and may be varied over a wide period of time, according to the practice of this invention, to permit partial conversion of the mustard flavor precursors to isothiocyanate compounds. Advantage may be taken of these various rate and inactivation time factors to produce a unique mustard product with a desired level of isothiocyanate compounds and, accordingly, a controlled amount of "bite."

It can be seen then that the operating conditions for the practice of this invention are interrelated and may be varied according to the particular requirements of the desired mustard product. The level of isothiocyanate compounds in the mustard product may be decreased resulting in a lessened degree of "bite" by increasing the temperature of the steam (increasing absolute pressure of vaporization), decreasing particle size of the mustard seed contacted by the steam, or increasing the quality of the steam which thus provides less moisture and less hydration. For example, to produce a relatively bland mustard product substantially free from mustard "bite," whole mustard seed may be contacted with saturated steam of high quality at pressures above atmospheric.

Although a wide variety of effective steam temperatures may be provided by changing the absolute pressure of the steam, it is preferred to use saturated steam at atmospheric pressure. The myrosinase in whole mustard seed may be wholly inactivated with atmospheric steam in from about 5 minutes to about 10 minutes. The extent of isothiocyanate conversion during the steam treatment may then be controlled by changing the quality of the steam or the time of contact. It has been found desirable to provide a steam quality of 98 or less to avoid imparting a burnt flavor or cooked taste to the final product. This refers to the quality of the steam at the time that it is brought into contact with the mustard product. The sensible heat required to raise the temperature of the mustard seed will, of course, result in condensation of part of the steam to cause a decrease in steam quality. However, the steam is supplied at such a rate that, at all times, the moisture content of the steam is a minor amount, as compared to the mustard product. Of course, as described above, if it is considered desirable to produce a mustard product with a higher lever of isothiocyanates, lower quality steam may be used, or the seed may be cracked before contacting with the steam. However, if the particle size of the mustard seed is reduced to below about 60 mesh, prior to contact with the steam, the rate of heat transfer is increased to an undesirable level. As used herein in this application, "mesh" refers to U.S. Standard Sieve sizes.

The inactivated hydrated mustard seed may then be ground to a desired particle size to provide for various commercial uses of the product. The hydrated ground mustard seed should be of a particle size which will pass a 40 mesh screen, but a particle size which will pass an 80 mesh screen is preferred.

Grinding can be accomplished by wet milling the seed in slurry form in a suitable mill, such as a stone mill or may be accomplished by dry grinding in a hammer mill. In order to achieve the desired particle size by wet milling, it has been found that two successive passes through the mill are preferred. If two passes are used, on the first pass a relatively coarse product, which will pass through about a 60 mesh screen, is produced. In the second pass, the mill is set to reduce this relatively coarse product to the fine size desired for the final product. When dry grinding is effected by use of a hammer mill, the inactivated hydrated mustard seed is first dried to prevent blinding of the hammer mill screen. The hammer mill may then be used in combination with an air classifying system to produce the desired particle size.

After grinding, the seed is dried to produce a finished product which can be stored for prolonged periods without deterioration of the product. The finely divided condition of the whole mustard seed allows it to be efficiently dried. Drying can be accomplished by any suitable means. Generally, drying to a level of less than about 5 percent moisture based on weight of total product is preferable and drying should be effected to less than about 10 percent moisture to prevent spoilage. Drying to moisture contents less than 5 percent, although likewise suitable, does not substantially further improve the properties of the final product to an extent where it is economically practical.

The improved mustard product is suitable for use as a material having excellent properties of water absorption and fat emulsification in food products. The product is also suitable for use in food products, such as sauces, dressings, soups, spice mixes, animal feeds and other similar products. The product is also an excellent carrier for other spices.

The improved product can be used in small amounts, such as about 1 percent by weight, in sausage meat to provide a product which has little fat separation, or water separation. The improved product is also useful for inclusion in sandwich meats, such as bologna, liver sausage, and the like, which are often merchandised in cellophane, Saran, or other transparent packaging materials. Also, the improved properties of the product make it valuable as an additive for meat products which are to be smoked or otherwise cured. The product of the present invention decreases the moisture loss or shrinkage which would otherwise occur during curing processes and thereby provides a more attractive and better tasting final product. In addition, there is evidence that color and texture of meat products are improved, and that, in the manufacture of skinless frankfurters and the like, the inclusion of the product enables the synthetic casing to be more easily removed.

The following example is provided to illustrate a specific process embodying various features of the invention which more clearly describe certain steps, but this example is in no way intended to limit or restrict the scope of the invention.

EXAMPLE I

Whole Alba type mustard seed was subjected to steam treatment to inactivate the enzyme myrosinase. The steam treatment was effected by passing saturated steam at atmospheric pressure (212° F.) through a 2-inch diameter by 15-inch long screw feeder while in concurrent flow with the whole mustard seed. The degree of steam treatment to which the seed was subjected was controlled by varying the speed of rotation of the screw feed mechanism and consequently the time during which the seed was contacted by the steam. After discharge from the screw feeder, the seed was dried to a moisture content of 5 percent by weight or less. The dried seed was then dry ground to minus 40 mesh in a hammer mill.

Samples 1, 2, and 3 which had been subjected to steam treatment for 2, 5, and 10 minutes respectively, were then analyzed for isothiocyanate content before and after incubation of the dried product. The incubation step consisted in mixing the dry, ground seed with water and holding for a period of 1½ hours at 23° C. This permits any residual myrosinase enzyme that has not been inactivated to complete conversion of mustard flavor precursors to isothiocyanates to the extent possible. The amount of isothiocyanates before incubation is a measure of the extent of conversion of mustard flavor precursors to isothiocyanates that has occurred during the steam treatment. The amount of isothiocyanates formed during incubation is a measure of the extent to which myrosinase has been inactivated during the steam treatment; the lower this amount the more effective the inactivation has been. The results are presented below in Table I and are compared with Sample 4 which is untreated Alba type mustard seed.

TABLE I

| Sample No.: | Time contacted with 212° F. saturated steam, minutes | Isothiocyanate content, weight percent [1] | |
| --- | --- | --- | --- |
| | | Formed during steam treatment | Formed during incubation |
| 1 | 2 | 0.25 | 2.10 |
| 2 | 5 | 0.32 | 0.06 |
| 3 | 10 | 0.46 | 0.00 |
| 4 | (²) | | 1.92 |

[1] As determined by the butylamine method, decribed in Analytical Chemistry, vol. 20, p. 1084, 1948, Siggia and Hanna.
² Control, no steam treatment.

From the above table, it can be readily seen that a controlled degree of formation of isothiocyanates and of inactivation of the enzyme myrosinase may be obtained by the steam inactivation method of this invention.

The present invention provides an improved mustard product which has excellent flavor and spice carrier properties. This mustard product is suitable for use as is, or as a mixture with other natural spices and/or spice oils. Such mixture provides a complete spice having the improved properties provided by the mustard product of this invention including a variable and controlled degree of bite.

Various of the features of the invention are set forth in the following claims.

What is claimed is:

1. A process for producing a mustard product with a controlled degree of bite which comprises contacting mustard seed with saturated steam, and maintaining the mustard seed in contact with the steam for a time sufficient to inactivate the enzyme myrosinase to provide a mustard product with a controlled degree of bite and a non-toasted flavor comprising endosperm and spermoderm.

2. The process of claim 1 wherein the steam has a quality of less than about 98.

3. The process of claim 1 wherein the mustard seed is maintained in contact with the steam for a period of time of less than about 10 minutes.

4. The process of claim 1 wherein the mustard seed after being contacted with steam is further treated to reduce the particle size of the mustard seed to at least about 40 mesh.

5. The process of claim 1 wherein the mustard seed is dried after contacting with steam to provide a mustard product having a moisture content less than about 10 percent by weight of the mustard product.

6. The process of claim 1 wherein the mustard seed is maintained in contact with the steam for a period of time sufficient to fully inactivate the enzyme myrosinase so as to provide a bland mustard product.

References Cited

UNITED STATES PATENTS 3,148,071  9/1964  Meusel et al. _____ 99—140X

FOREIGN PATENTS 412,967  7/1934  Great Britain _____ 99—140

LIONEL M. SHAPIRO, Primary Examiner

D. M. NAFF, Assistant Examiner

U.S. Cl. X.R.

99—2, 107, 109, 124, 144